US012008870B2

(12) United States Patent
Hillstrom et al.

(10) Patent No.: US 12,008,870 B2
(45) Date of Patent: *Jun. 11, 2024

(54) ELECTRONIC GAMING MACHINE HAVING A REEL ASSEMBLY AND METHOD OF MAKING REEL STRIPS

(71) Applicant: IGT, Las Vegas, NV (US)

(72) Inventors: Lauren Hillstrom, Reno, NV (US); Gary Sanchez, Reno, NV (US); Anton Walker, Reno, NV (US); Kyle Rothchild, Carson City, NV (US)

(73) Assignee: IGT, Las Vegas, NV (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/454,135

(22) Filed: Nov. 9, 2021

(65) Prior Publication Data

US 2022/0058919 A1 Feb. 24, 2022

Related U.S. Application Data

(63) Continuation of application No. 16/287,582, filed on Feb. 27, 2019, now Pat. No. 11,183,032.

(51) Int. Cl.

*G07F 17/34* (2006.01)
*B41M 5/00* (2006.01)
*G07F 17/32* (2006.01)

(52) U.S. Cl.

CPC ........... *G07F 17/34* (2013.01); *B41M 5/0088* (2013.01); *G07F 17/3216* (2013.01)

(58) Field of Classification Search

CPC .. G07F 17/34; G07F 17/3211; G07F 17/3213; G07F 17/32; G07F 17/3202; A63F 9/24

See application file for complete search history.

(56) References Cited

U.S. PATENT DOCUMENTS

| | | | |
|---|---|---|---|
| 6,926,606 | B2 | 8/2005 | Onuki et al. |
| 6,976,915 | B2 | 12/2005 | Baker et al. |
| 7,371,171 | B1 | 5/2008 | Englman et al. |
| 7,874,909 | B2 | 1/2011 | Pryzby et al. |
| 8,223,113 | B2 | 7/2012 | Kerofsky |
| 8,323,113 | B2 | 12/2012 | Kaminkow et al. |
| 8,556,730 | B2 | 10/2013 | Jo |
| 8,608,319 | B2 | 12/2013 | Griswold et al. |
| 8,814,654 | B2 | 8/2014 | Hoffman et al. |
| 9,208,654 | B2 | 12/2015 | Kondo et al. |
| 9,396,617 | B2 | 7/2016 | Kitamura et al. |
| 9,898,898 | B2 | 2/2018 | Brewer et al. |
| 2003/0190948 | A1 | 10/2003 | Baerlocher et al. |
| 2004/0021705 | A1 | 2/2004 | Baker et al. |
| 2006/0198987 | A1 | 9/2006 | Grob et al. |

(Continued)

FOREIGN PATENT DOCUMENTS

JP 2013176515 A 9/2013

*Primary Examiner* — William H McCulloch, Jr.
*Assistant Examiner* — Ankit B Doshi
(74) *Attorney, Agent, or Firm* — Neal, Gerber & Eisenberg LLP

(57) ABSTRACT

A gaming system including a housing and a reel assembly supported by the housing, the reel assembly including reel having a reel strip manufactured using an inkjet printing process and having one or move designated symbols that can be revealed or hidden depending on the lighting of the reel strip.

20 Claims, 8 Drawing Sheets

(56) References Cited

U.S. PATENT DOCUMENTS

| | | | | |
|---|---|---|---|---|
| 2011/0115156 | A1 | 5/2011 | Stewart | |
| 2014/0342797 | A1* | 11/2014 | Fujisawa | G07F 17/34<br>463/20 |
| 2015/0087384 | A1 | 3/2015 | Brewer et al. | |

* cited by examiner

ELECTRONIC GAMING MACHINE HAVING A REEL ASSEMBLY AND METHOD OF MAKING REEL STRIPS

PRIORITY

This application is a continuation of, claims priority to, and the benefit of U.S. patent application Ser. No. 16/287,582, filed Feb. 27, 2019, the entire contents of which are incorporated herein by reference.

BACKGROUND

The present disclosure relates to gaming machines, and more particularly gaming machines that include a reel assembly having one or more reel strips. Reel strips may include a base plastic member and one or more layers of ink on the member.

BRIEF SUMMARY

Various embodiments of the present disclosure are directed to a gaming system, and particularly an electronic gaming machine including a housing and a reel assembly supported by the housing. In various embodiments, the reel assembly includes one or more reels each having a reel strip including one or more designated symbols that can be revealed or hidden depending on the state of game play of the electronic gaming machine. The reel strip is manufactured using one of the inkjet printing methods described below.

Various embodiments of the present disclosure provide an electronic gaming machine including a housing and a reel assembly supported by the housing. The reel assembly includes a physical reel including a reel strip. The reel strip includes an elongated strip including a front side and a back side. The reel strip includes a first layer including a coat of a base color inkjet printed on the back side of the elongated strip with spaced apart openings for a plurality of non-hidden symbols of the reel strip. The reel strip includes a second layer including a coat of a first color inkjet printed on the back side of the elongated strip in the spaced apart openings of the first layer for the non-hidden symbols, and a second color inkjet printed on the first layer at an area of a hidden symbol of the reel strip. The reel strip includes a third layer including a coat of a first amount of the base color inkjet printed on the first color of the second layer for the non-hidden symbols, and not printed on the second color for the hidden symbol, and a second lesser amount of the base color inkjet printed on the second color for the hidden symbol.

Various embodiments of the present disclosure provide an electronic gaming machine including a housing and a reel assembly supported by the housing. The reel assembly includes a physical reel including a reel strip. The reel strip includes an elongated strip including a front side and a back side. The reel strip includes a first layer including a coat of a base color inkjet printed on the back side of the elongated strip with spaced apart openings for a plurality of non-hidden symbols of the reel strip. The reel strip includes a second layer including a coat of a first color inkjet printed on the back side of the elongated strip in the spaced apart openings of the first layer for the non-hidden symbols, a second opposing color inkjet printed on the first layer in an area where no symbols are formed on the reel strip, and a third color inkjet printed on the first layer in an area where a hidden symbol is formed in and integrated manner with one of the non-hidden symbols. The reel strip includes a third layer including a coat of the base color inkjet printed on the first layer and the second layer except on the third color. The reel strip includes a fourth layer including a coat of the second opposing color inkjet printed on the second layer and third layer except at areas of the non-hidden symbols and the hidden symbol.

Various embodiments of the present disclosure provide an electronic gaming machine including a housing and a reel assembly supported by the housing. The reel assembly includes a physical reel including a reel strip. The reel strip includes an elongated strip including a front side and a back side. The reel strip includes a first layer including a coat of a base color inkjet printed on the back side of the elongated strip with spaced apart openings for a plurality of non-hidden symbols of the reel strip. The reel strip includes a second layer including a coat of a color inkjet printed on the back side of the elongated strip in the spaced apart openings of the first layer for the non-hidden symbols. The reel strip includes a third layer including a coat of the base color inkjet printed on the first layer and the second layer except in an area of a hidden symbol of the reel strip, and wherein the hidden symbol has no color. The reel strip includes a fourth layer including a coat of an opposing color inkjet printed except in the area of the hidden symbol.

Additional features are described herein, and will be apparent from, the following Detailed Description and the Figures.

BRIEF DESCRIPTION OF SEVERAL OF THE DRAWINGS

DETAILED DESCRIPTION

Various embodiments of the present disclosure are directed to gaming systems and particularly to electronic gaming machines ("EGMs"). For brevity and clarity, and unless specifically stated otherwise, the term "EGM" is used herein to refer to an electronic gaming machine (such as but not limited to a slot machine).

Figure 1:
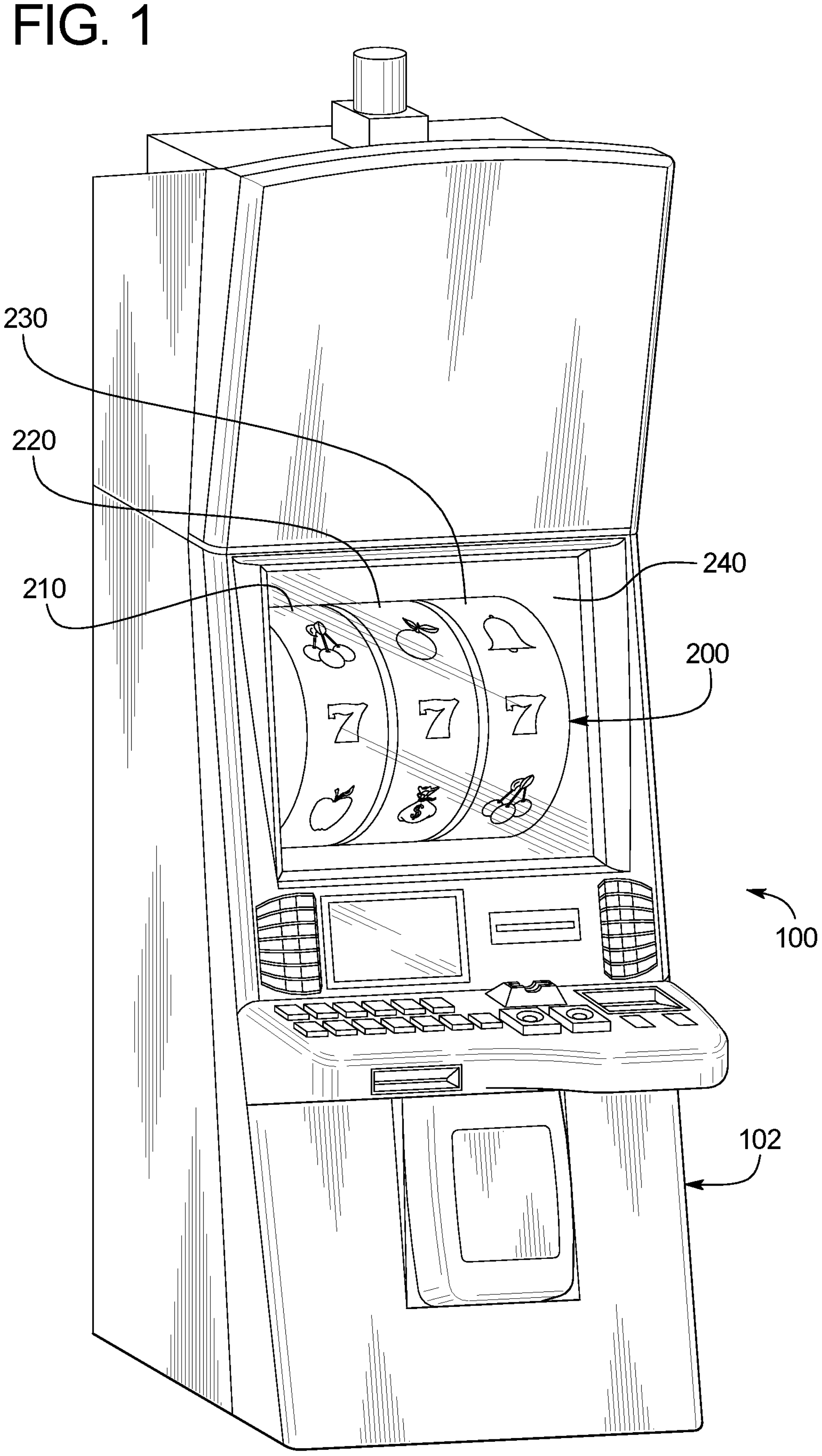
FIG. 1 is a front perspective view of an electronic gaming machine of one example embodiment of the present disclosure, and showing a physical reel assembly including a plurality of rotatable physical reels.
Figure 2:
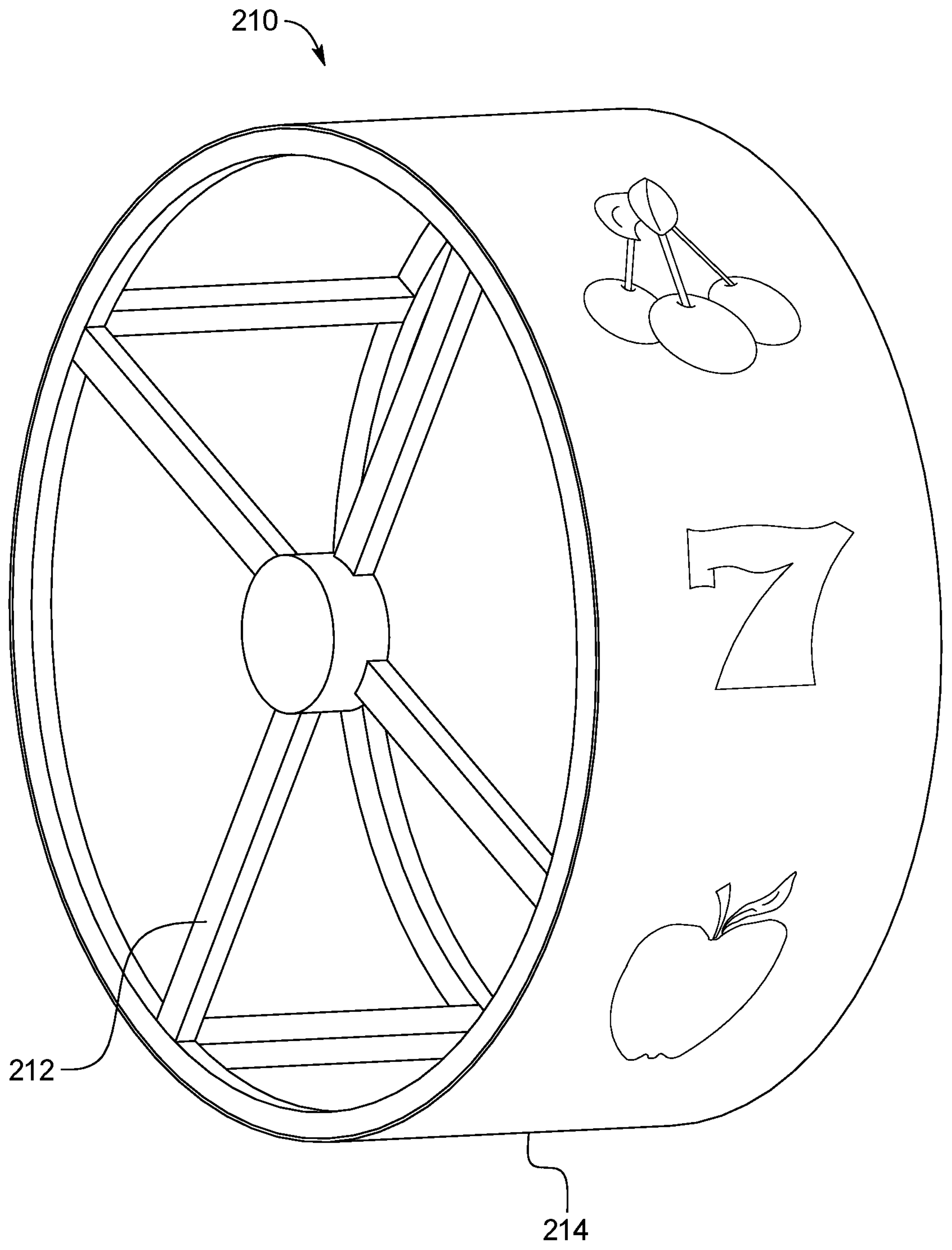
FIG. 2 is an enlarged front perspective view of one of the reels of the physical reel assembly of the electronic gaming machine of FIG. 1.

Referring now to FIGS. 1 and 2, one example embodiment of an EGM of the present disclosure is illustrated and generally indicated by numeral 100. This example EGM 100 includes a housing 102 that supports numerous components of the EGM 100 such as one or more input devices and one or more display devices. It should be appreciated that only certain of the components of the EGM are illustrated and described herein, and that one of ordinary skill in the art would understand the various components not illustrated or described herein. It should be appreciated that the quantity of input devices and display devices of the EGM may vary in accordance with the present disclosure. It should be also be appreciated that the relative positions of the input devices and display devices of the EGM may vary in accordance with the present disclosure. In this illustrated example embodiment, the EGM 100 further includes a processor (not shown in FIGS. 1 to 7B), and a memory device (not shown in FIGS. 1 to 7B) that stores a plurality of instructions, which when executed by the processor, causes the processor to operate with the input and display devices of the EGM 100 to provide the various functionality of the EGM 100. The processor may be any of the processors described below, and the memory device may be any of the memory devices described below.

In this illustrated example embodiment, one of the display devices include a physical reel assembly 200 supported by the housing 102. In this illustrated example embodiment, the reel assembly 200 includes: (1) a suitable frame assembly (not shown); (2) a plurality of rotatable physical reels 210, 220, and 230 suitably supported by the frame assembly (not shown); and (3) a plurality of reel actuators (not shown) suitably supported by the frame assembly and suitably coupled to the rotatable physical reels 210, 220, and 230. It should be appreciated that the reel assembly 200 can be positioned in the housing 102 behind a see through plastic or glass panel 240 in a suitable manner to prevent access to the reel assembly 200. In this illustrated example embodiment, each of the rotatable physical reels 210, 220, and 230 includes a basket and a reel strip attached to the basket. For example, as shown in FIG. 2, reel 210 includes a basket 212 and a reel strip 214 suitably attached to the basket 212.

The present disclosure provides various methods of manufacturing such reel strips 214 using inkjet printing methods as further described below, and various reels strips manufactured using such methods as further described below. In various embodiments, one or more of these example reel strips includes one or more designated symbols that are each revealed and thus visible at certain times during operation of the EGM 100 and that are each hidden and thus not visible at certain times during operation of the EGM 100. For brevity, these designated symbols on the example reel strips 300, 400, 500, and 600 described below are referred to herein as "hidden" symbols. For brevity, the other symbols on the example reel strips 300, 400, 500, and 600 that are always revealed or visible are referred to herein as "non-hidden" symbols. The example reel strips 300, 400, 500, and 600 described below can be employed as the reel strips for reels 200, 220, and 230 or any other suitable reels for an EGM or other gaming machines.

The present disclosure further provides various methods of front and back lighting the reel strips (with the one or more hidden symbols) as further described below to reveal or to hide such symbols. In various embodiments, the present disclosure contemplates an EGM such as EGM 100 selectively employing different relative amounts of front lighting and back lighting of the reel strip (with one or more of the hidden symbols) to cause the hidden symbol on the reel strip to either be hidden and not visible to the player or to be revealed and thus visible to the player. In various embodiments of the present disclosure, the EGM can change the lighting percentages (such as the LED RGB (red, green, blue) values) of the front lighting and the back lighting for causing the respective hidden and revealed states of the hidden symbol during gameplay (or otherwise).

Generally, a first lighting approach of the present disclosure includes reducing or increasing the amount of light in front of and/or behind the reel strip to hide or reveal the hidden symbol as desired. With this first approach, reducing the lighting behind the reel strip and increasing the lighting in front of the reel strip hides the hidden symbol. With this approach, increasing the lighting behind the reel strip and reducing the lighting in front of the reel strip reveals the hidden symbol.

Generally, a second approach of the present disclosure includes keeping a symbol lit from behind using one or more colored lights and/or altering the color of the light to hide or reveal the hidden symbol. With this second approach, lighting in a primary color behind the hidden symbol is used to hide the hidden symbol, and lighting in a secondary color is used to reveal the hidden symbol. The present disclosure contemplates that these lighting approaches can be employed individually for each hidden symbol or for groups of hidden symbols on one or more reels.

It should be appreciated that the reel assembly may be otherwise suitably sized and configured in accordance with the present disclosure. It should be appreciated that the reel assembly can operate as part of a primary game, as part of a secondary game, as part of an attract mode, or in any suitable manner.

A first example reel strip and an example first method of making a reel strip in accordance with the present disclosure includes an elongated strip having a front side and a back side. The reel strip further includes: (1) a first layer including one or more coats of a base color inkjet printed on the back side of the elongated strip with spaced apart openings for a plurality of non-hidden symbols of the reel strip; (2) a second layer including a coat of: (a) a first color inkjet printed on the back side of the elongated strip in the spaced apart openings of the first layer for the non-hidden symbols, and (b) a second color inkjet printed on the first layer at an area of a hidden symbol of the reel strip; and (3) a third layer including a coat of: (a) a first amount of the base color inkjet printed on the first color of the second layer for the non-hidden symbols, and not printed on the second color for the hidden symbol, and (b) a second lesser amount of the base color inkjet printed on the second color for the hidden symbol. In various such embodiments, the base color is white, and the first layer includes two coats of the white base color. In various such embodiments, the second layer includes two coats of the first color inkjet printed on the back side of the elongated strip in the spaced apart openings of the first layer for the non-hidden symbols, and the second layer includes two coats of the second color inkjet printed on the first layer at the area of the hidden symbol. In various such embodiments, for the third layer, the first amount of the base color inkjet printed on the first color of the second layer for the non-hidden symbols includes two coats of the base color. In various such embodiments, for the third layer, the second lesser amount of the base color inkjet printed on the second color for the hidden symbol includes approximately 60% of the first amount of the base color inkjet printed on the first color of the second layer for the non-hidden symbols.

Figure 3:
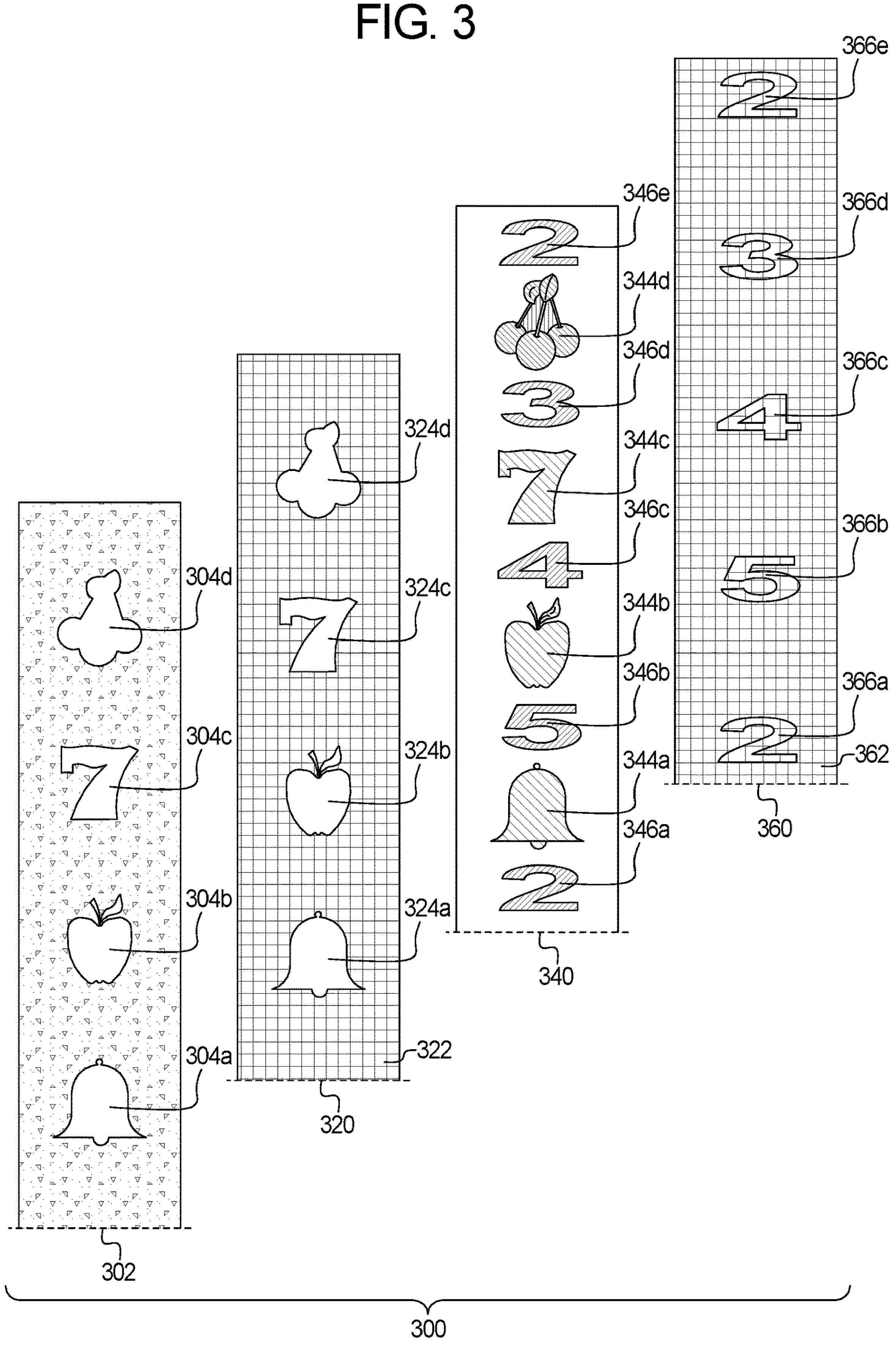
FIG. 3 is an exploded fragmentary view of a reel strip of a first example embodiment of the present disclosure, showing the laminate layer of the reel strip.

For example, as indicated by FIG. 3, the reel strip 300 includes a plastic elongated strip 302 (such as a topcoat polyester 7 mil roll) having a front side and a back side. It should be appreciated that the present disclosure contemplates that the elongated strip in this example embodiment (and the other example embodiments disclosed herein) can be partially made of plastic and can be a laminate or laminated material. It should be appreciated that FIG. 3 shows only a portion of this reel strip 300.

In this illustrated example embodiment, the hidden symbols include the first "2" symbol, the "5" symbol, the "4" symbol, the "3" symbol, and the second "2" symbol, and the non-hidden symbols are the bell symbol, the apple symbol, the seven symbol, and the cherry symbol. In this example, the elongated strip 302 includes a white glitter laminate with spaced apart non glitter clear areas 304*a*, 304*b*, 304*c*, and 304*d* in the shape of and for each respective non-hidden symbol. The back side of this elongated strip 302 is coated with the following inkjet printed layers in the following order: (1) a first layer 320 including two coats of a white base color 322 printed on back side of the elongated strip 302 with spaced apart openings or areas 324*a*, 324*b*, 324*c*, and 324*d* in the shape of and for each respective non-hidden symbol; (2) a second layer 340 including two coats of: (a) one or more colors 344*a*, 344*b*, 344*c*, and 344*d* in the shape of and for each respective non-hidden symbol printed on back side of the elongated strip 302 in spaced apart openings or areas 304*a*, 304*b*, 304*c*, and 304*d* of the strip 302 and for showing each non-hidden symbol, and (b) one or more colors 346*a*, 346*b*, 346*c*, 346*d*, and 346*e* in the shape of and for each respective hidden symbol printed on the white base color 322 of the first layer 320; and (3) a third layer 360 including two coats of: (a) the white base color 362 printed on the back of the white first color 322 (except for the areas of the hidden symbols) and on each non-hidden symbol, and (b) the white base color 366*a*, 366*b*, 366*c*, 366*d*, and 366*e* printed at approximately 60% in the shape of and for each respective areas of the hidden symbols. The method of making this reel strip 300 includes applying these layers to the back side of the elongated strip 302 in the order set forth above.

In various embodiments for such reels strip 300, the EGM 100 uses front lighting (not shown) to illuminate the non-hidden symbols. In various embodiments for such reels strip 300, the EGM 100 selectively uses back lighting (not shown) to selectively illuminate the hidden symbols and make them visible to a player.

A second example reel strip and an example second method of making a reel strip in accordance with the present disclosure includes an elongated strip having a front side and a back side. The reel strip further includes: (1) a first layer including a coat of a base color inkjet printed on the back side of the elongated strip with spaced apart openings for a plurality of non-hidden symbols of the reel strip; (2) a second layer including a coat of: (a) a first color inkjet printed on the back side of the elongated strip in the spaced apart openings of the first layer for the non-hidden symbols, (b) a second opposing color inkjet printed on the first layer in an area where no symbols are formed on the reel strip, and (c) a third color inkjet printed on the first layer in an area where a hidden symbol is formed in an integrated manner with one of the non-hidden symbols; (3) a third layer including a coat of the base color inkjet printed on the first layer and the second layer except on the third color; and (4) a fourth layer including a coat of the second opposing color inkjet printed on the second layer and third layer except at areas of the non-hidden symbols and the hidden symbol. In various such embodiments, the base color is white, and the first layer includes two coats of the white base color. In various embodiments, the second layer includes two coats of each of the first color, the second opposing color, and the third color. In various such embodiments, the second opposing color is black. In various such embodiments, the third layer includes only one coat of the white base color on the first layer and the second layer except on the third color. In various such embodiments, the second opposing color is black.

Figure 4:
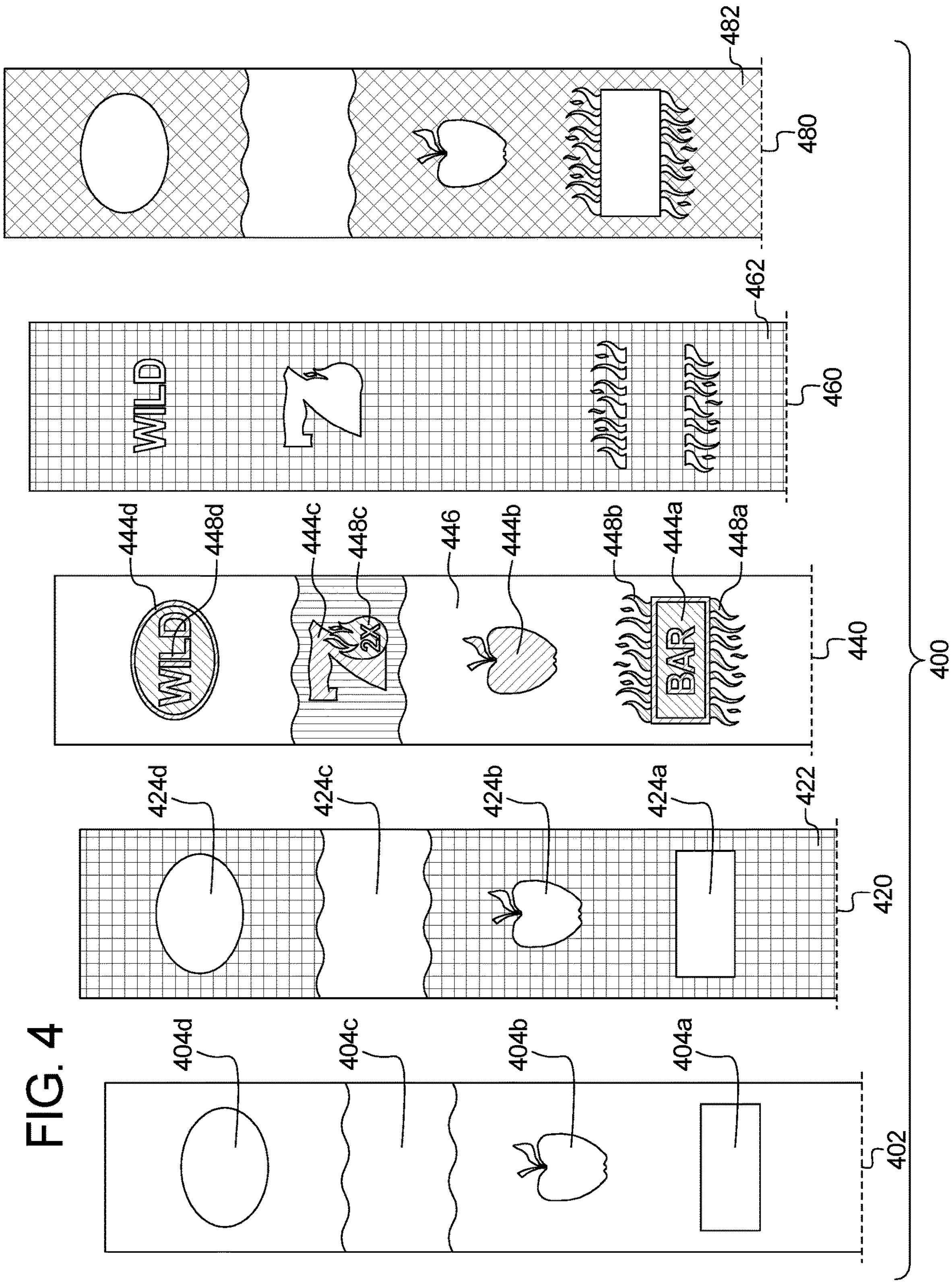
FIG. 4 is an exploded fragmentary view of a reel strip of a second example embodiment of the present disclosure, showing the laminate layer of the reel strip and the inkjet printed layers of the reel strip.

For example, as indicated by FIG. 4, the reel strip 400 includes a plastic elongated strip 402 (such as a topcoat polyester 7 mil roll). It should be appreciated that the present disclosure contemplates that the elongated strip 402 in this example embodiment (and the other example embodiments disclosed herein) can be partially made of plastic and can be a laminate or laminated material. It should be appreciated that FIG. 4 shows only a portion of this reel strip 400.

In this illustrated example embodiment, the hidden symbols include the individual letters "W," "I," "L," and "D" of the WILD symbol, the 2× symbol integrated into the seven symbol, and the flame symbols, and the non-hidden symbols are the bar symbol, the apple symbol, the seven symbol, and part of the wild symbol. In this example, the elongated strip 402 includes a white laminate with spaced apart clear areas 404*a*, 404*b*, 404*c*, and 404*d* in the shape of and for each respective non-hidden symbol. The back side of this elongated strip 402 is coated with the following inkjet printed layers in the following order: (1) a first layer 420 including two coats of a white base color 422 printed on back side of the elongated strip 402 with spaced apart openings 424*a*, 424*b*, 424*c*, and 424*d* in the shape of and for each respective non-hidden symbol; (2) a second layer 440 including two coats of: (a) one or more colors 444*a*, 444*b*, 444*c*, and 444*d* printed on back side of the elongated strip in the spaced apart openings 424*a*, 424*b*, 424*c*, and 424*d* of the first layer 420 for showing each non-hidden symbol, (b) an opposing black color 446 printed on white base color 422 in the areas where no symbols are formed, and (c) one or more colors 448*a*, 448*b*, 448*c*, and 448*d* printed in the shape of and for each respective hidden symbol on the white base color 422 in the areas where hidden symbols are formed in integrated fashion with the non-hidden symbols; (3) a third layer 460 including a coat of the white base color 462 printed on the back of the white first color 422 and the second layer 440 except where the color of the hidden symbols are formed; and (4) a fourth layer 480 including a coat of the opposing black color 482 printed except in the areas of the non-hidden symbols and the areas of the hidden symbols. The method of making this reel strip includes applying these layers to the back side of the elongated strip in the order set forth above.

In various embodiments for such reels strips, the EGM uses front lighting to illuminate the non-hidden symbols. In various embodiments for such reels strips, the EGM selectively uses back lighting to selectively illuminate the hidden symbols integrated with the non-hidden symbols to make them visible (to the player) in an integrated manner with the respective non-hidden symbols.

A third example reel strip and an example third method of making a reel strip in accordance with the present disclosure includes an elongated strip having a front side and a back side. The reel strip further includes: (1) a first layer including a coat of a base color inkjet printed on the back side of the elongated strip with spaced apart openings for a plurality of non-hidden symbols of the reel strip; (2) a second layer including a coat of a second different color inkjet printed on the back side of the elongated strip in the spaced apart openings of the first layer for the non-hidden symbols; (3) a third layer including a coat of the base color inkjet printed on the first layer and the second layer except in an area of a hidden symbol of the reel strip, wherein the hidden symbol has no color; and (4) a fourth layer including a coat of an opposing color inkjet printed except in the area of the hidden symbol. In various such embodiments, the base color is white and the first layer includes two coats of the base color. In various such embodiments, the second layer includes two coats of the second color. In various such embodiments, the second layer does not include any opposing color to the base color. In various such embodiments, the third layer includes one coat of the base color inkjet printed on the first layer and two coats on the second layer except in the area of the hidden symbol of the reel strip. In various such embodiments, the opposing color is black.

Figure 5:
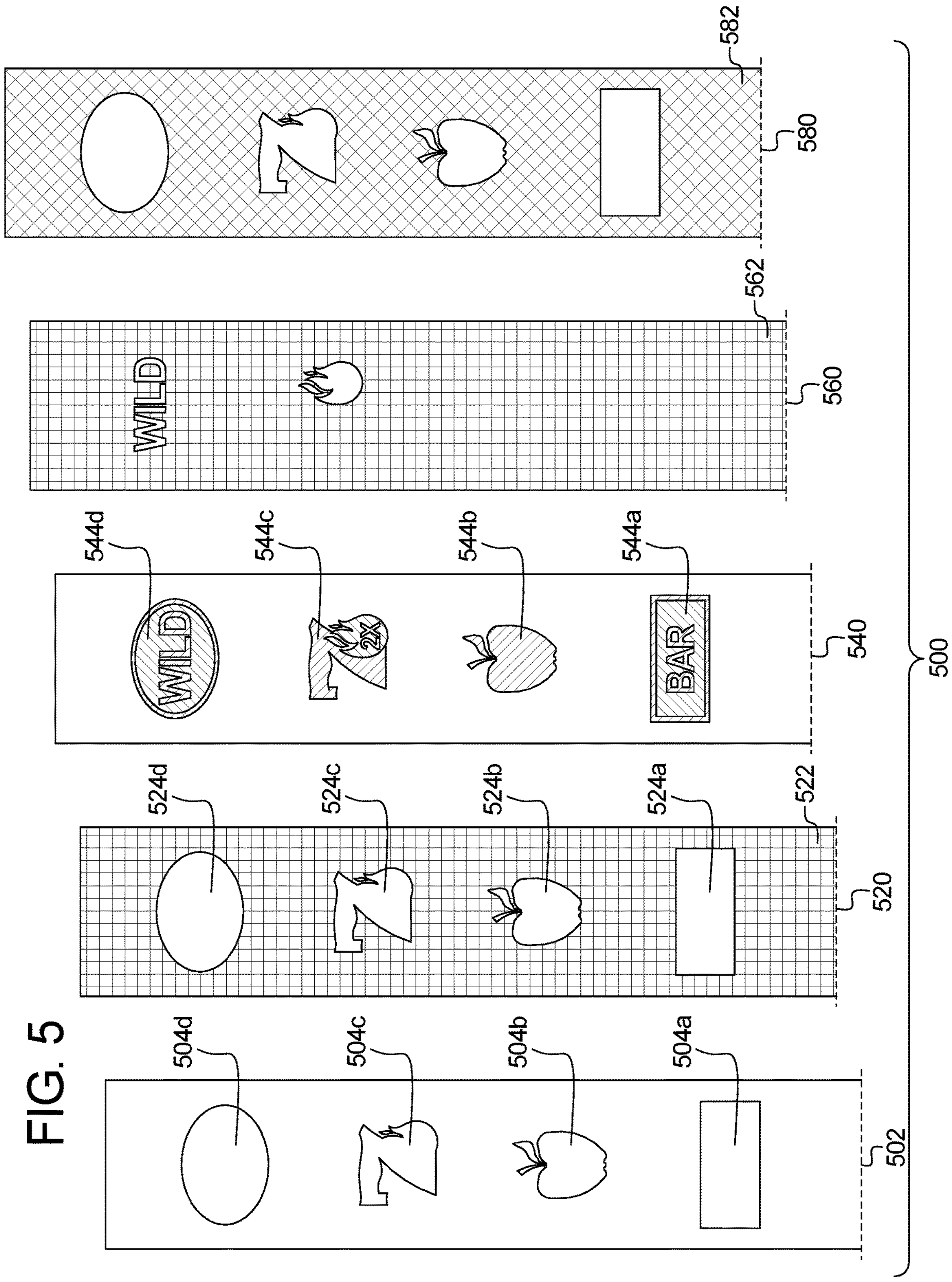
FIG. 5 is an exploded fragmentary view of a reel strip of a third example embodiment of the present disclosure, showing the laminate layer of the reel strip and the inkjet printed layers of the reel strip.

For example, as indicated by FIG. 5, in this illustrated example embodiment, the reel strip 500 includes a plastic elongated strip (such as a topcoat polyester 7 mil roll). It should be appreciated that the present disclosure contemplates that the elongated strip in this example embodiment (and the other example embodiments disclosed herein) can be partially made of plastic and can be a laminate or laminated material. It should be appreciated that FIG. 5 shows only a portion of this reel strip 500.

In this illustrated example embodiment, the hidden symbols include the individual letters "W," "I," "L," and "D" of the WILD symbol and the 2× symbol, and the non-hidden symbols are the bar symbol, the apple symbol, the seven symbol, and part of the wild symbol. In this example, the elongated strip 502 includes a white laminate with spaced apart clear areas 504*a,* 504*b,* 504*c,* and 504*d* in the shape of and for each respective non-hidden symbol. The back side of this elongated strip 502 is coated with the following inkjet printed layers in the following order: (1) a first layer 520 including two coats of a white base color 522 printed on back side of the elongated strip 502 with spaced apart openings 524*a,* 524*b,* 524*c,* and 524*d* for each non-hidden symbol; (2) a second layer 540 including two coats of: (1) one or more colors 544*a,* 544*b,* 544*c,* and 544*d* printed on back side of the elongated strip 502 in the spaced apart areas 504*a,* 504*b,* 504*c,* and 504*d* of the first layer 502 for showing each non-hidden symbol (and were no opposing black color is used for/or on this layer); (3) a third layer 560 including a coat of the white base color 562 printed on the back of the white first layer 520 and the second layer 540 except in the shape of and for where each of the hidden symbols are formed; and (4) a fourth layer 580 including a coat of the opposing black color 582 printed except in the areas of the non-hidden symbols and hidden symbols. The method of making this reel strip includes applying these layers to the back side of the elongated strip in the order set forth above.

In various embodiments for such reels strips, the EGM uses front lighting to illuminate the non-hidden symbols. In various embodiments for such reels strips, the EGM selectively uses back lighting in the desired different color(s) of the hidden symbols to selectively illuminate the hidden symbols to make them visible (to the player). In this example, the backlighting is the color of the hidden symbols.

Figure 6:
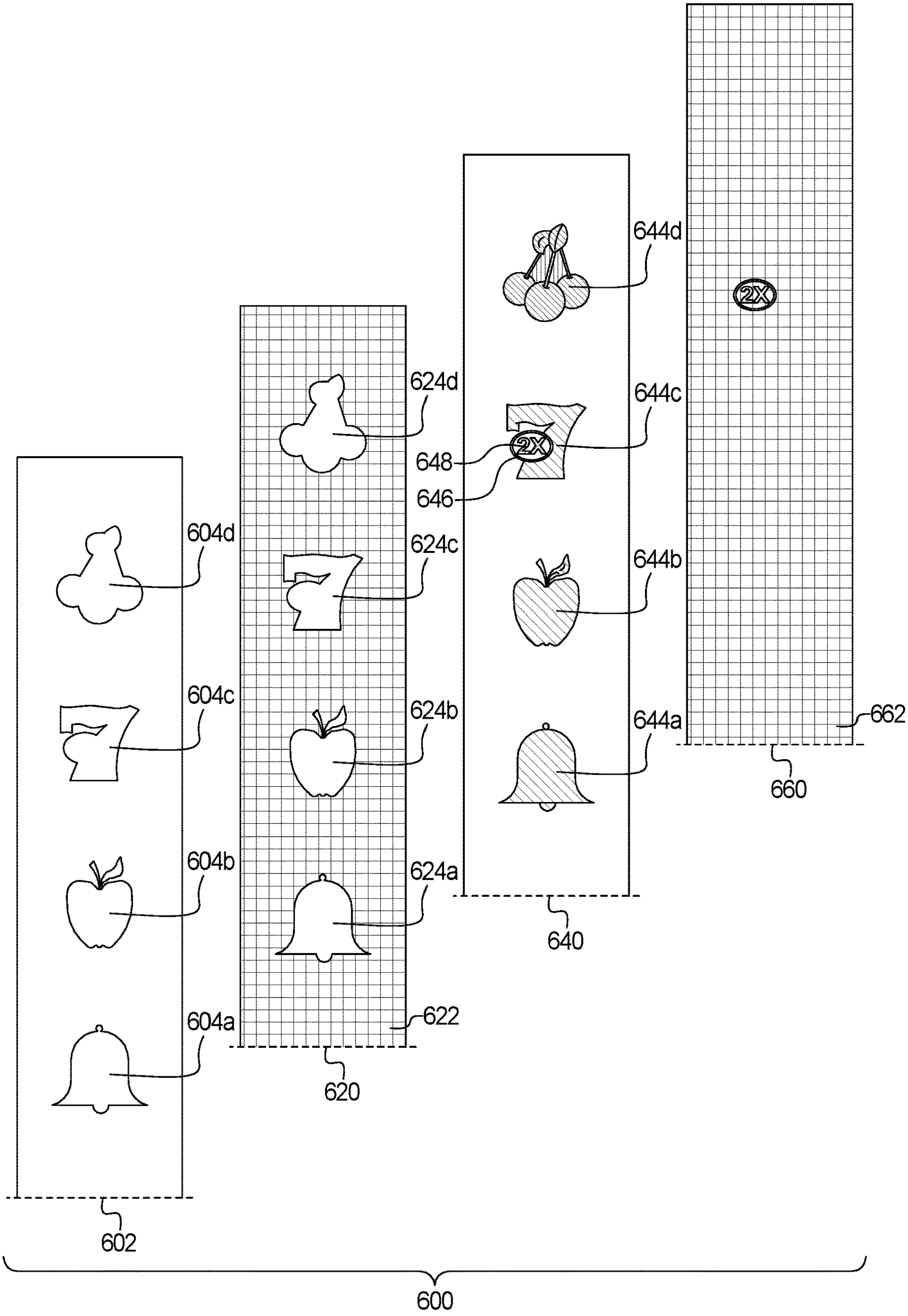
FIG. 6 is an exploded fragmentary view of a reel strip of a fourth example embodiment of the present disclosure, showing the laminate layer of the reel strip and the inkjet printed layers of the reel strip.

Referring now to FIG. 6, a fourth example reel strip 600 and an example fourth method of making a reel strip in accordance with the present disclosure is generally indicated. This example reel strip includes an elongated strip 602 having a front side and a back side. In this illustrated example embodiment, the reel strip 600 includes a plastic elongated strip (such as a topcoat polyester 7 mil roll). It should be appreciated that the present disclosure contemplates that the elongated strip in this example embodiment (and the other example embodiments disclosed herein) can be partially made of plastic and can be a laminate or laminated material. It should be appreciated that FIG. 6 shows only a portion of this reel strip 600.

In this illustrated example embodiment, the hidden symbols include the 2× symbol, and the non-hidden symbols are the bell symbol, the apple symbol, the seven symbol, and the cherry symbol. In this example, the elongated strip 602 includes a white laminate with spaced apart clear areas 604*a,* 604*b,* 604*c,* and 604*d* in the shape of and for each respective non-hidden symbol. The back side of this elongated strip 602 is coated with the following inkjet printed layers in the following order: (1) a first layer 620 including two coats of a white base color 622 printed on back side of the elongated strip 602 with spaced apart openings 624*a,* 624*b,* 624*c,* and 624*d* in the shape of and for each non-hidden symbol; (2) a second layer 640 including two coats of: (a) one or more colors 644*a,* 644*b,* 644*c,* and 644*d* printed on back side of the elongated strip in spaced apart areas 604*a,* 604*b,* 604*c,* and 604*d* of the first layer 620 in the shape of and for showing each non-hidden symbol; (b) a first hidden symbol color 646 (such as red) printed in a first integrated hidden area of a non-hidden symbol; and (c) a second different hidden symbol color 648 (such as blue) printed in a second integrated hidden area of a non-hidden symbol; and (3) a third layer 660 including two coats 662 of the white base color printed on the back of the first layer 620 and the second layer 640 except where the color of the hidden symbols are formed. The method of making this reel strip includes applying these layers to the back side of the elongated strip in the order set forth above.

In various embodiments for such reels strips, the EGM uses front lighting to illuminate the non-hidden symbols. In various embodiments for such reels strips, the EGM selectively uses back lighting in two different colors to selectively illuminate the hidden symbols integrated with the non-hidden symbols to make them visible (to the player) in an integrated manner with the respective non-hidden symbols. In this example, the hidden symbols are shown when the EGM switches modes—such as in a bonus mode or a tournament mode.

Figure 7A:
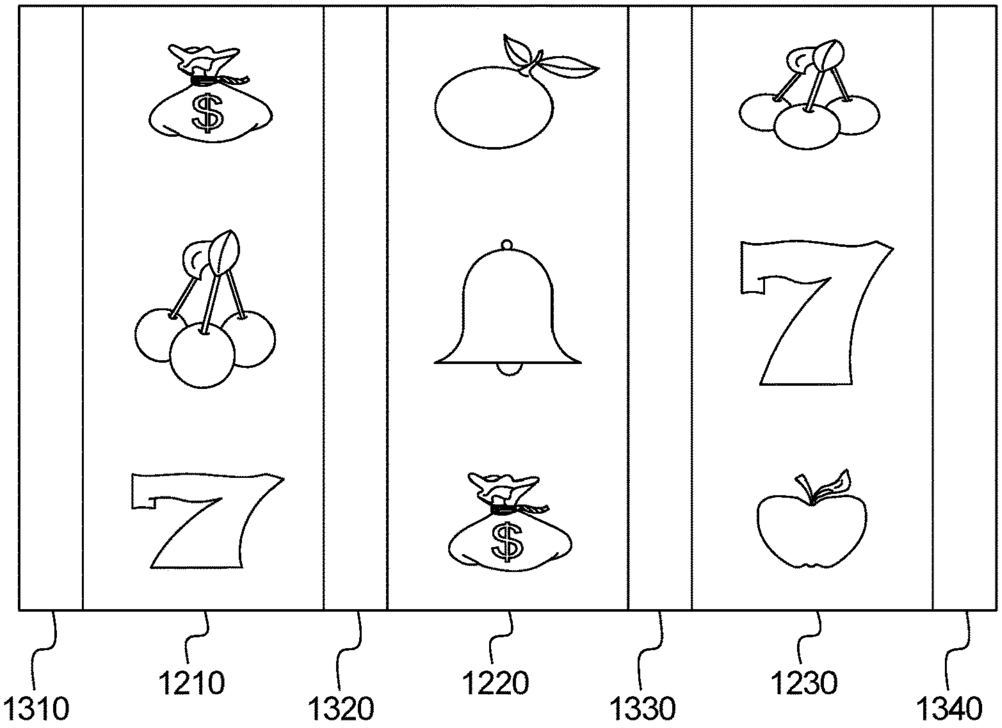
FIG. 7A is a front view of a plurality of reels and a plurality of reel dividers of another example embodiment of the present disclosure, wherein the dividers include hidden symbols in a non-visible state.
Figure 7B:
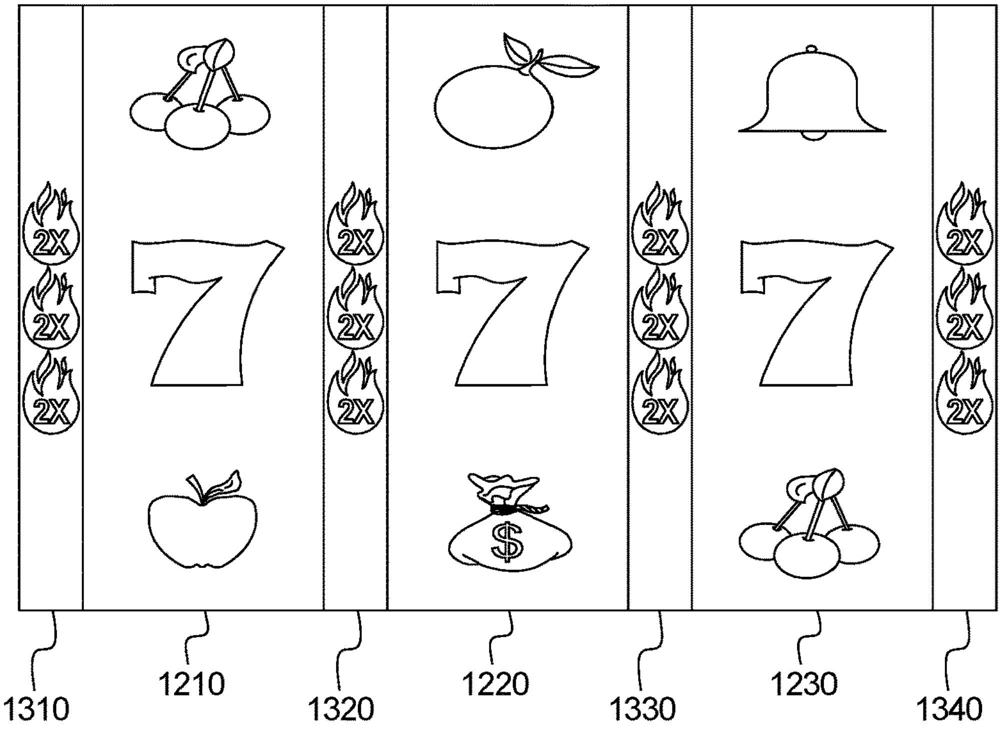
FIG. 7B is a front view of the plurality of reels and the plurality of reel dividers of FIG. 7A showing the hidden symbols on the dividers in a visible state.

It should be appreciated that the above described methods for manufacturing such reel strips can be employed to manufacture often components of an EGM such as dividers for reel assemblies. For example, as shown in FIG. 7A, the EGM (not shown) includes a plurality of reels 1210, 1220, and 1230 and a plurality of reel dividers 1310, 1320, 1330, and 1340 surrounding and between the reels 1210, 1220, and 1230. The dividers 1310, 1320, 1330, and 1340 include the hidden symbols. FIG. 7B shows the hidden symbols on the dividers in a visible state. Any suitable method of making the reel striped described herein can be employed for making the dividers.

It should be appreciated that various embodiments of the present disclosure contemplate that during the base game play of the EGM, the EGM reduces the backlighting to 0% or approximately 0% behind the hidden symbols and the EGM increase the front lighting 100% or approximately white light in front of the hidden symbols to keep the symbols hidden for the duration of the base game.

It should be appreciated that various embodiments of the present disclosure contemplate that when a bonus game is entered, the EGM alters the backlighting to show a specific color (such as green) behind the reel strips thus illuminating the entire strip from behind and revealing the hidden symbols (such as credit values) in that specific color (such as green).

It should be appreciated that various embodiments of the present disclosure contemplate that to highlight awarded credit amounts via hidden symbols, the EGM uses 100% white back lighting directly behind the awarded hidden symbol credit values (such as 750, 100, 50, etc.) so that the player can discern between awarded hidden credit amounts (backlit with white light) and the non-awarded hidden credit amounts (backlit with green light).

It should further be appreciated that various embodiments of the present disclosure contemplate that, when the game switches to a bonus mode (such as a tournament mode), the EGM uses 32% white back lighting to keep the hidden portions of the symbols visible during such bonus game play.

It should further be appreciated that various embodiments of the present disclosure contemplate that the EGM uses 6% white back lighting so that the game does not look too dark or broken during base game play. This small percent of white back lighting behind the visible symbols facilitates enough light to expose the visible symbols in an acceptable manner without revealing any adjacent hidden symbols. In certain such embodiments, to reveal the hidden symbols, the EGM reduces the front lighting to 0% and increases the back lighting to 100% (of a specific color).

In certain embodiments of the present disclosure, the hidden symbol portion of an integrated symbol is printed in blue, and a secondary graphic is printed in red to help keep the hidden message hidden. To keep the blue-printed message hidden, the EGM uses 96% red back lighting and 39% white front lighting. To reveal the hidden message, the EGM uses 100% blue back lighting and 32% white front lighting.

In certain embodiments of the present disclosure, the EGM uses 19% red back lighting to keep the hidden symbol hidden for certain peripheral edge-cases where the symbol is outside of the playable area, but still within sight of the player.

It should be appreciated from these example embodiments, that the hidden symbols can be employed to display any suitable images.

It should also be appreciated that the various embodiments of the present disclosure each provide specific enhancements and technical improvements to EGMs, specifically including but not limited to improved reel strips, improved reel dividers, and improved other components that provided one or more non-hidden symbols and one or more hidden symbols that can be selectively revealed to a player at specific points in time during game play to enhance the game play on the EGM. The inkjet printing methods described herein are additionally more cost effective than various previously known reel strip manufacturing methods.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts configured to operate with one or more EGMs; and/or (b) one or more stand-alone EGMs. In other words, in various embodiments, the gaming system of the present disclosure includes: (a) one or more electronic gaming machines in combination with one or more central servers, central controllers, or remote hosts; (b) a single electronic gaming machine; or (c) a plurality of electronic gaming machines in combination with one another.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM in combination with a central server, central controller, or remote host, the central server, central controller, or remote host is any suitable computing device (such as a server) that includes at least one processor and at least one memory device or data storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. one, more than one, or each of the functions of the central server, central controller, or remote host may be performed by the at least one processor of the EGM. Further, one, more than one, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM, are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client). In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. In certain embodiments in which the data network is a WAN, the gaming system includes a central server, central controller, or remote host and an EGM, each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 8:
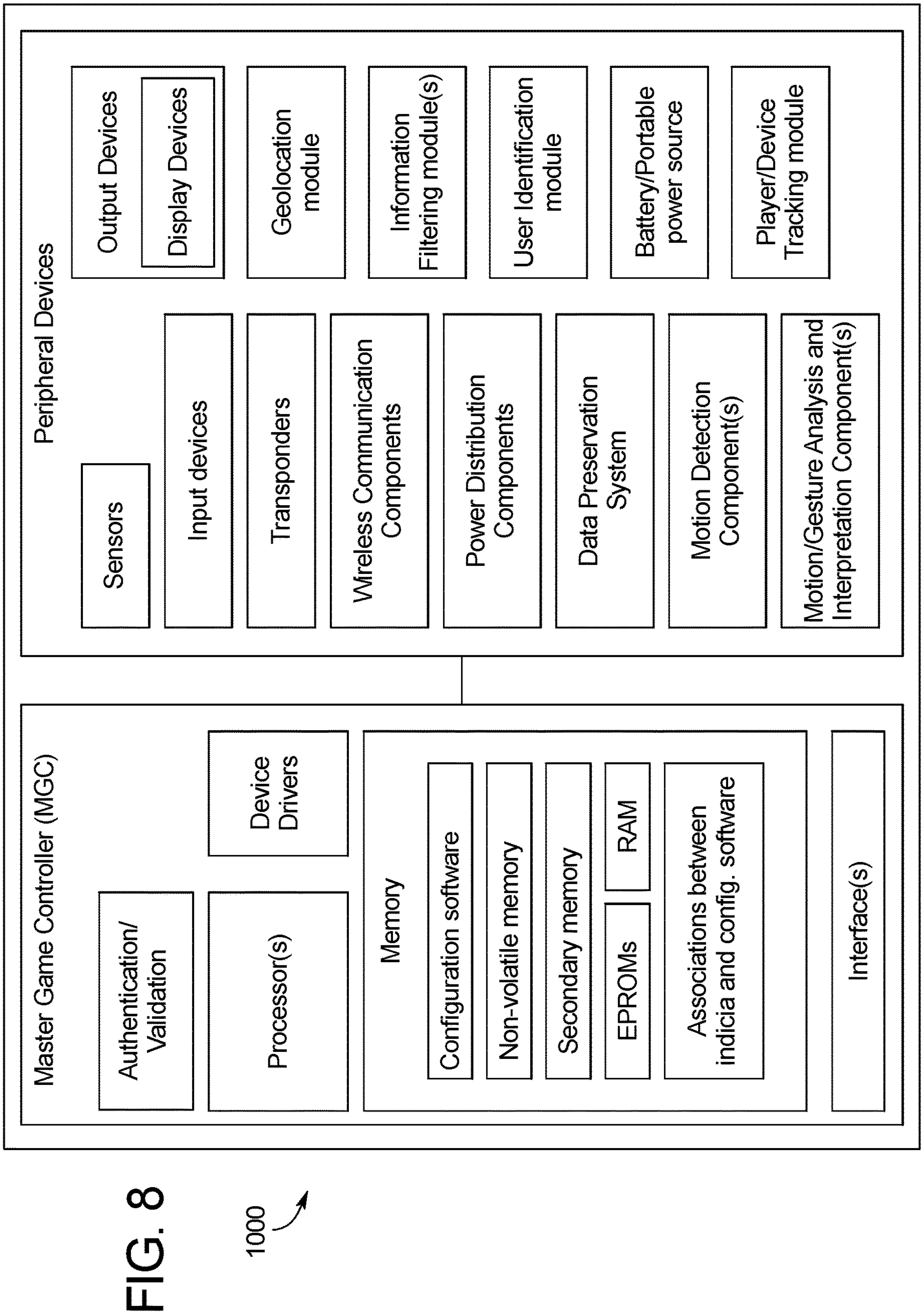
FIG. 8 is a schematic block diagram of one embodiment of an electronic configuration of an example gaming system disclosed herein.

It should be appreciated that FIGS. 1 and 8 include example EGMs 100 and 1000, and different EGMs may be implemented using different combinations of the components described below but not shown.

In these embodiments, the EGM includes a master gaming controller configured to communicate with and to operate with a plurality of peripheral devices.

The master gaming controller includes at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface of the master gaming controller; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices (such as input/output devices); and/or (5) controlling the peripheral devices. In certain embodiments, one or more components of the master gaming controller (such as the at least one processor) reside within a housing of the EGM (described below), while in other embodiments at least one component of the master gaming controller resides outside of the housing of the EGM.

The master gaming controller also includes at least one memory device, which includes: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device resides within the housing of the EGM (described below), while in other embodiments at least one component of the at least one memory device resides outside of the housing of the EGM.

The at least one memory device is configured to store, for example: (1) configuration software, such as all the parameters and settings for a game playable on the EGM; (2) associations between configuration indicia read from an EGM with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller communicates with other devices using a serial communication protocol. A few non-limiting examples of serial communication protocols that other devices, such as peripherals (e.g., a bill validator or a ticket printer), may use to communicate with the master game controller include USB, RS-232, and Netplex (a proprietary protocol developed by IGT).

In certain embodiments, the at least one memory device is configured to store program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

The at least one memory device also stores a plurality of device drivers. Examples of different types of device drivers include device drivers for EGM components and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device can be upgraded as needed. For instance, when the at least one memory device is a hard drive, new games, new game options, new parameters, new settings for existing parameters, new settings for new parameters, new device drivers, and new communication protocols can be uploaded to the at least one memory device from the master game controller or from some other external device. As another example, when the at least one memory device includes a CD/DVD drive including a CD/DVD configured to store game options, parameters, and settings, the software stored in the at least one memory device can be upgraded by replacing a first CD/DVD with a second CD/DVD. In yet another example, when the at least one memory device uses flash memory or EPROM units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device also stores authentication and/or validation components configured to authenticate/validate specified EGM components and/or information, such as hardware components, software components, firmware components, peripheral device components, user input device components, information received from one or more user input devices, information stored in the at least one memory device, etc. Examples of various authentication and/or validation components are described in U.S. Pat. No. 6,620,047, entitled "Electronic Gaming Apparatus Having Authentication Data Sets."

In certain embodiments, the peripheral devices include several device interfaces, such as: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one player/device tracking module; and (14) at least one information filtering module.

The at least one output device includes at least one display device configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 100 illustrated in FIG. 1 includes a central display device, a player tracking display, a credit display, and a bet display.

In various embodiments, one or more of the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more keno grids, one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGM 100 illustrated in FIG. 1 includes a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275, 991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGM 100 illustrated in FIG. 1 includes a plurality of speakers. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device may include any suitable device that enables an input signal to be produced and received by the at least one processor of the EGM.

In one embodiment, the at least one input device includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGM 100 illustrated in FIG. 1 includes a combined bill and ticket acceptor and a coin slot.

In one embodiment, the at least one input device includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). one such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. In other embodiments, the EGM begins game play automatically upon appropriate funding rather than upon utilization of the game play activation device.

In other embodiments, the at least one input device includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance.

In various embodiments, the at least one input device includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick).

In certain embodiments, the at least one input device includes a touch-screen coupled to a touch-screen controller or other touch-sensitive display overlay to enable interaction with any images displayed on a display device (as described below). one such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device includes a card reader in communication with the at least one processor of the EGM. The card reader is configured to read a player identification card inserted into the card reader.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component is configured to distribute power to one or more internal components of the EGM, such as one or more rechargeable power sources (e.g., rechargeable batteries) located at the EGM.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component is configured to detect or sense one or more events and/or conditions that, for example, may result in damage to the EGM and/or that may result in loss of information associated with the EGM. Additionally, the data preservation system may be operable to initiate one or more appropriate action(s) in response to the detection of such events/conditions.

The at least one motion/gesture analysis and interpretation component is configured to analyze and/or interpret information relating to detected player movements and/or gestures to determine appropriate player input information relating to the detected player movements and/or gestures. For example, in one embodiment, the at least one motion/gesture analysis and interpretation component is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source enables the EGM to operate in a mobile environment. For example, in one embodiment, the EGM includes one or more rechargeable batteries.

The at least one geolocation module is configured to acquire geolocation information from one or more remote sources and use the acquired geolocation information to determine information relating to a relative and/or absolute position of the EGM. For example, in one implementation, the at least one geolocation module is configured to receive GPS signal information for use in determining the position or location of the EGM. In another implementation, the at least one geolocation module is configured to receive multiple wireless signals from multiple remote devices (e.g., EGMs, servers, wireless access points, etc.) and use the signal information to compute position/location information relating to the position or location of the EGM.

The at least one user identification module is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module is configured to perform filtering (e.g., based on specified criteria) of selected information to be displayed at one or more displays of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGM 100 illustrated in FIG. 1, the EGM has a housing that provides support for a plurality of the input devices and the output devices of the EGM. Further, the EGM is configured such that a player may operate it while standing or sitting.

In various embodiments, the EGM is positioned on a base or stand, or is configured as a pub-style tabletop game (not shown) that a player may operate typically while sitting. Different example EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a keno-type game, the gaming system includes one or more keno boards in either an electromechanical form or in a video form. Each keno board displays a plurality of indicia or symbols, such as numbers, letters, or other images that typically correspond to a theme associated with the gaming system.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the gaming system provides credits or other awards for one or more plays of one or more secondary games. The secondary game typically enables an award to be obtained in addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity."

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network server to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems From General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents in a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electronic gaming machine comprising:

a housing;

a reel assembly supported by the housing, the reel assembly comprising a physical reel comprising a reel strip, the reel strip comprising:

an elongated strip comprising a front side and a back side, a first layer comprising a coat of a first color on the back side of the elongated strip, a second layer comprising a coat of a second color on a back side of the first layer and at an area of a hidden symbol of the reel strip, and a third layer comprising a coat of the first color on a back side of the second layer at the area of the hidden symbol; and back lighting supported by the housing and configured to selectively illuminate the hidden symbol to make the hidden symbol visible to a player at a first time and to make the hidden symbol not visible to the player at a subsequent second time.

2. The electronic gaming machine of claim 1, wherein the first color is white.

3. The electronic gaming machine of claim 2, wherein the second layer comprises multiple coats of the second color.

4. The electronic gaming machine of claim 3, wherein the third layer comprises multiple coats of the first color.

5. The electronic gaming machine of claim 1, which comprises front lighting configured to selectively illuminate the reel strip at a first intensity level and to lower the first intensity level to co-act with the back lighting to make the hidden symbol visible to the player.

6. The electronic gaming machine of claim 5, which comprises front lighting configured to selectively illuminate the reel strip at the first intensity level to make a non-hidden symbol on the reel strip visible to the player and to make the hidden symbol not visible to the player.

7. An electronic gaming machine comprising:

a housing; and a reel assembly supported by the housing, the reel assembly comprising a physical reel comprising a reel strip, the reel strip comprising:

an elongated strip comprising a front side and a back side, a first layer comprising a coat of a first color on the back side of the elongated strip, a second layer comprising a coat of a second color on a back side of the first layer in an area where a hidden symbol is formed in an integrated manner with a non-hidden symbol, a third layer comprising a coat of a third color on a back side of the second layer except at the area of the hidden symbol, and a fourth layer comprising a coat of a fourth color on a back side of the third layer except at the area of the hidden symbol and the non-hidden symbol.

8. The electronic gaming machine of claim 7, wherein the first color is white.

9. The electronic gaming machine of claim 8, wherein the fourth color is black.

10. The electronic gaming machine of claim 7, wherein the first color and the third color are a same color.

11. The electronic gaming machine of claim 7, wherein the third layer is also on the first layer.

12. The electronic gaming machine of claim 11, wherein the fourth layer is also on the third layer.

13. The electronic gaming machine of claim 7, which comprises back lighting configured to selectively illuminate the hidden symbol to make the hidden symbol visible to a player.

14. The electronic gaming machine of claim 13, which comprises front lighting configured to selectively illuminate the reel strip at a first intensity level to make a non-hidden symbol on the reel strip visible to a plyer and to make the hidden symbol not visible to the player.

15. An electronic gaming machine comprising:

a housing; and a reel assembly supported by the housing, the reel assembly comprising a physical reel comprising a reel strip, the reel strip comprising:

an elongated strip comprising a front side and a back side, a first layer comprising a coat of a first color on the back side of the elongated strip with an opening for a non-hidden symbol of the reel strip, a second layer comprising a coat of a second color on the back side of the elongated strip in the opening, a third layer comprising a coat of a third color on a back side of the first layer and a back side of the second layer except in an area of a hidden symbol of the reel strip, wherein the hidden symbol has no color, and a fourth layer comprising a coat of a fourth color except in the area of the hidden symbol.

16. The electronic gaming machine of claim 15, wherein the first color is white.

17. The electronic gaming machine of claim 16, wherein the second layer does not comprise any opposing color to the first color.

18. The electronic gaming machine of claim 16, wherein the fourth color is black.

19. The electronic gaming machine of claim 15, wherein the first color and the third color are a same color.

20. The electronic gaming machine of claim 15, which comprises back lighting configured to selectively illuminate the hidden symbol to make the hidden symbol visible to a player.

* * * * *